Sept. 19, 1939.    T. P. CHASE    2,173,647
BRAKE BOOSTER
Filed Oct. 1, 1937
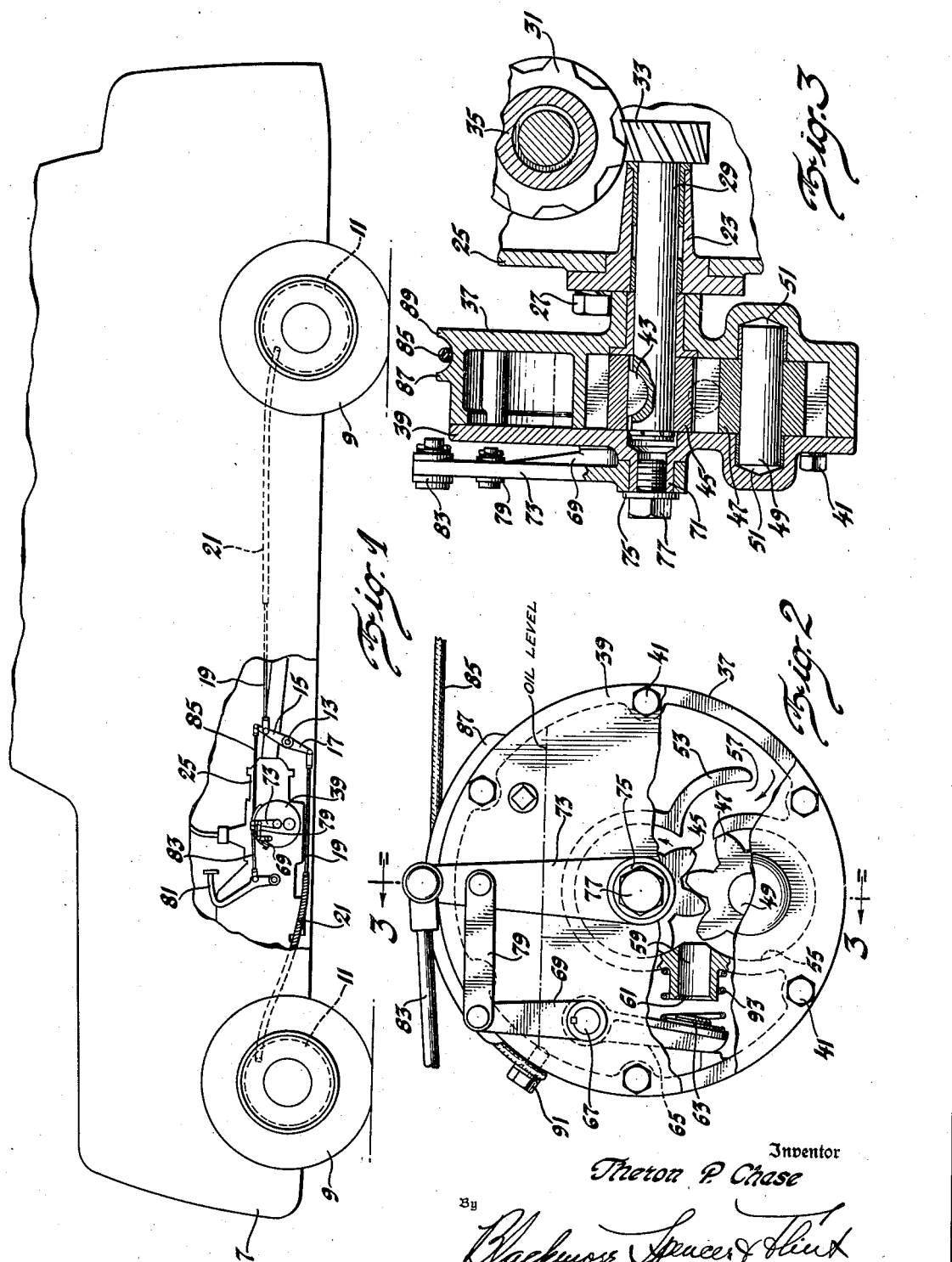
Inventor
Theron P. Chase
By
Blackmore, Spencer & Flint
Attorneys Patented Sept. 19, 1939

2,173,647

UNITED STATES PATENT OFFICE 2,173,647

BRAKE BOOSTER

Theron P. Chase, Detroit, Mich., assignor to General Motors Corporation, Detroit, Mich., a corporation of Delaware Application October 1, 1937, Serial No. 166,745

6 Claims. (Cl. 188—152)

It has been proposed in the past to lessen the manual effort required to apply the brakes of vehicles by the resort to other sources of power under the control of the operator. The present invention has that purpose for its major object.

As more specific objects, the invention seeks to attain the major object by hydraulic mechanism which shall function efficiently, which shall embody the well-known follow-up action and which shall be simple and comparatively inexpensive.

Other objects and advantages will be understood from the following description:

Accompanying this description is a drawing illustrative of one embodiment which the inventive idea may assume.

In the drawing:

Figure 1 is a view of a motor vehicle in side elevation, the view being partly broken away to show a portion of the brake system.

Figure 2 is a view in elevation, partly broken away and in section of an accessory device which I propose to assemble alongside the change speed mechanism to provide the servo device which is to supplement the manual effort in applying the brakes.

Figure 3 is a section on line 3—3 of Figure 2.

Referring to the drawing for a better understanding of the invention, it will be seen that the vehicle as a whole is identified by numeral 7, its wheels being marked 9. Associated with the wheels, preferably one for each wheel, are brake drums 11 within which are brake shoes, not shown, the shoes to be suitably anchored and to be spread apart into frictional contact with the brake drums by cams or some equivalent means. The drawing shows a rock shaft 13 having upper and lower arms 15 and 17. Suitable cables 19, preferably within cable housings 21 are connected to arms 15 and 17 and extend to or into the brake drums and serve to actuate the shoe expanding mechanism. It is unnecessary to more particularly describe the details of the specific structure of the parts by which a counter-clockwise rotation of shaft 13 spreads the brake shoes through the instrumentality of the cables. Such details may be varied as desired and their specific form constitutes no part of this invention.

A sleeve 23 projects through an opening in the side wall 25 of the change speed gear box. It may be secured in place by fastening means 27.

A shaft 29 is rotatably supported by the sleeve 23. Shaft 29 is driven by gearing elements 31 and 33, the former on a transmission driven shaft 35 and the latter on the end of shaft 29. In order to secure uni-directional rotation of shaft 29, it may be assumed that shaft 35 is the conventional counter-shaft of the change speed mechanism.

Rotatably supported adjacent the gear box and for rotation about but independently of shaft 29 is a chambered housing 37, the housing being closed by a cover 39. The cover may be secured to the housing by fastening means 41. The housing and cover constitute a rotatable winding drum. Keyed at 43 to the end of shaft 29 is a pump gear 45. Gear 45 snugly fits the space between the housing and the cover. Meshing with and driven by gear 45 is an idler gear 47, the shaft 49 of which is journaled in recesses 51 of the housing and cover. The housing is formed internally with walls 53 and 55 which surround the gears there being an inlet at 57 between these walls and a discharge outlet 59. The outlet terminates with a seat 61 adapted to be engaged by a valve or closure disc 63, the disc being formed on the end of a lever 65 rotatably supported by a pivot axis 67 carried by the cover. Axis 67 extends outside the cover and to its outer end is fixed a lever 69. Journaled on a short axial hub 71 of the cover is a lever 73, the latter being held in position by a washer 75 and a threaded bolt 77. This lever 73 is connected to lever 69 by a link 79. The manually operated brake pedal 81 is connected to the extreme end of lever 73 by a link 83. A flexible cable 85 is wrapped partially around the circular wall of housing 37 between ribs 87 and 89 and it is anchored to the housing at 91. The cable extends to and is attached to the extreme end of lever 15.

The winding drum formed by the housing 37 and its cover contains a suitable hydraulic medium such as oil. While the vehicle is being driven the gears 45 and 47 within their surrounding walls 53 and 55 constitute an oil pump. The oil enters at 57, flows around between the gears and the walls and is discharged at 59. Figure 2 shows the operating system in its idle position wherein the pump outlet is open. Suitable spring means such as spring 93 serves to hold the valve 63 off its seat. If it be desired to apply the brake, the pedal 81 is depressed. The first response to the pedal depression is a rotation of the winding drum formed by the housing and the cover as the unit and the cable wound about this drum functions to rotate rock shaft 13 whereupon the cables 19 cause the shoes to engage the brake drums. This action occurs rather than a rotation of lever 73 independently of the drum resulting in a closure of the outlet 59 for the reason that the movement of the brake shoes into contact with the brake drums offers less resistance than does the compression of spring 93. When, however, the pedal is further depressed, the shoes which are now in contact with the brake drums, offer greater resistance than the force required to overcome the tension of spring 93. As a result of this difference in resistance lever 73 rotates about the axis of the winding drum and through the instrumentality of link 79 and lever 69, it moves the valve 63 against its seat. Since the gear 45 is still being driven the reaction causes the winding drum to rotate. Such rotation of the winding drum more forcibly applies the brake shoes to the brake drums. In doing so, and if it be assumed that the pedal 81 and lever 73 remain stationary, lever 65 rotates about its axis and the valve opens. It can be again closed by further movement of the pedal 81. In consequence the operation embodies the desirable successive response to progressive movements commonly referred to as a follow-up action. It will be readily seen also that if the engine is not operating the pedal can apply the brake directly by rotating the winding drum. It will first take up the shoe clearance as before, it will then close the valve 63 upon its seat and further depression of the pedal will again rotate the winding drum and forcibly apply the shoes.

It will be obvious also that the winding drum and cable may operate, through suitable mechanism, the master cylinder of a hydraulic brake system in the event that the invention is applied to a vehicle equipped with hydraulically operated brakes.

Throughout the above description, the power or servo mechanism has been explained with reference to brakes. It should be explained that other uses are possible.

I claim:

1. A power transmission, a power take-off shaft driven thereby, a gear on said last named shaft, a winding drum housing said gear and rotatable about the axis of said take-off shaft, an idler gear supported by said winding drum in a position to mesh with said first-mentioned gear, said winding drum having an internal construction formed to constitute with said gears, a gear pump having an inlet and outlet, a valve to close said outlet, yielding means to hold said valve from said outlet, a lever rotatable to move said valve, said lever journaled to said winding drum, a second lever rotatable about the axis of said winding drum, link means between said levers, manually operable means to rotate the last-mentioned lever, a cable extending from said winding drum whereby actuation of the manually operable means may close the pump outlet and whereby work may be done by the resulting rotation of the winding drum acting through the cable.

2. A power booster adapted for the application of vehicle brakes comprising a rotatable winding drum, a connection from said drum adapted to apply brakes, a gear pump within said winding drum, said pump comprising a driven gear and an idler gear, manually operable means to close the outlet of said pump to effect rotation of said winding drum.

3. A power booster brake for vehicles comprising a change speed transmission, a power take-off shaft driven thereby, a winding drum mounted for rotation about the axis of said last-named shaft, a cable attached to said drum and means attached to said cable and operable to apply brakes, a gear pump within said winding drum including a gear on said take-off shaft and manually operable means to close the outlet of said pump and to thereby effect rotation of said winding drum.

4. The invention defined by claim 3 together with yielding means to resist closure of the pump outlet whereby the manually operable means may function to rotate the winding drum prior to the closure of said valve.

5. The invention defined by claim 3, said manually operable means including parts whereby the power servo device has a follow-up action.

6. The invention defined by claim 3, said manually operable means including parts whereby the power servo device has a follow-up action, said parts including a lever pivoted to rotate about the axis of said winding drum, means to rock said lever, a lever pivoted eccentrically to said winding drum, a link connecting said levers a valve operably connected to said off-center lever and operable to close the outlet of the pump.

THERON P. CHASE.